US007975050B2

(12) United States Patent
Genevois

(10) Patent No.: US 7,975,050 B2
(45) Date of Patent: Jul. 5, 2011

(54) CONDITIONAL ACCESS NETWORK

(75) Inventor: Christophe Genevois, Saint Bres (FR)

(73) Assignee: SmarDTV SA, Cheseaux-sur-Lausanne ( * ) Notice: Subject to any disclaimer, the term of this patent is extended or adjusted under 35 U.S.C. 154(b) by 731 days.

(21) Appl. No.: 10/511,249

(22) PCT Filed: Apr. 14, 2003

(86) PCT No.: PCT/EP03/03856
§ 371 (c)(1),
(2), (4) Date: Mar. 24, 2005

(87) PCT Pub. No.: WO03/088663
PCT Pub. Date: Oct. 23, 2003

(65) Prior Publication Data
US 2005/0165937 A1    Jul. 28, 2005

(30) Foreign Application Priority Data

Apr. 12, 2002  (DE) .................................. 102 16 384

(51) Int. Cl.
*G06F 15/173* (2006.01)
(52) U.S. Cl. .................. 709/225; 709/226; 709/229
(58) Field of Classification Search .................. 709/225, 709/226, 229; 710/100–317, 1–74
See application file for complete search history.

(56) References Cited

U.S. PATENT DOCUMENTS

| 5,420,866 | A |   | 5/1995  | Wasilewski |
|---|---|---|---|---|
| 5,892,900 | A | * | 4/1999  | Ginter et al. ............... 726/26 |
| 5,933,498 | A | * | 8/1999  | Schneck et al. ............ 705/54 |
| 6,006,332 | A | * | 12/1999 | Rabne et al. ................ 726/6 |
| 6,105,134 | A | * | 8/2000  | Pinder et al. ............... 713/170 |
| 6,157,719 | A | * | 12/2000 | Wasilewski et al. ........ 380/210 |
| 6,246,767 | B1 | * | 6/2001  | Akins et al. ................ 380/210 |
| 6,308,268 | B1 |   | 10/2001 | Audebert |
| 6,993,132 | B2 | * | 1/2006  | Khandelwal et al. ....... 380/232 |
| 2003/0012377 | A1 |  | 1/2003  | Guenebaud |
| 2004/0151315 | A1 | * | 8/2004  | Kim ............................ 380/241 |

FOREIGN PATENT DOCUMENTS

| EP | 0 696 141 A2 | 2/1996 |
|---|---|---|
| EP | 0 964 573 A1 | 12/1999 |
| FR | 2 803 160 A1 | 6/2001 |
| WO | WO 96/08912 | 3/1996 |
| WO | WO 01/26372 A1 | 4/2001 |

OTHER PUBLICATIONS

F.Kamperman et al., Conditional Access System Interoperability Through Software Downloading, Consumer Electronics, vol. 42, Issue 1, pp. 47-54, Feb. 2001.*

(Continued)

*Primary Examiner* — Rupal D Dharia
*Assistant Examiner* — Edward J Kim
(74) *Attorney, Agent, or Firm* — Stuart J. Friedman

(57) ABSTRACT

In a conditional access network a provider distributes valuable contents such as digital TV over the network and end-users are allowed to access such valuable contents in function of individual access rights defined by a user license. The valuable contents are made available to the end-users, by way of a plurality of different conditional access systems, each end-user is provided with a generic conditional access component having a basic functionality common to all conditional access systems, and particular conditional access systems are selectively enabled on each conditional access component subject to a successful verification of a corresponding license.

7 Claims, 4 Drawing Sheets

OTHER PUBLICATIONS

Coutro et al., "A Single Conditional Access System for Satellite-Cable and Terrestrial TV", IEEE Transactions on Consumer Electronics, vol. 35, No. 3, Aug. 1989.*

Schooneveld et al., "Standardization of Conditional Access Systems for Digital Pay Television", Philips DVS/3CORD, Broadcast Development Lab. Hilversum, Anthony Fokkerweg 5, 1223 ND Hilversum, The Netherlands, Philips Journal of Research vol. 50 No. 1/2 1996.*

Giachetti et al., "A Common Conditional Access Interface for Digital Video Broadcasting Decoders", IEEE Transactions on Consumer Electronics, vol. 41, No. 3, Aug. 1995.*

DVB Project Office, DVB (Digital Video Broadvasting), "Common Interface Specification for Conditional Access and Other Digitla Video Broadcasting Decoder Applications", DVB Document A017, May 31, 1996.*

David J. Cutts, "DVB Conditional Access", Electronics & Communication Engineering Journal, Feb. 1997.*

F.Kamperman et al, Conditional Access System Interoperability Through Software Downloading, Consumer Electronics, vol. 42, Issue 1, pp. 47-54, Feb. 2001.

EBU Project Group B/CA, Functional Model of a Conditonal Access System, 8301 EBU Review Technical , No. 266, 1995 (Winter), Grand-Saconnex, CH.

* cited by examiner

Flow chart of CAA enabler on the SMC side

CONDITIONAL ACCESS NETWORK

FIELD OF THE INVENTION

The present invention relates to a method of operating a conditional access network wherein a provider distributes valuable contents over the network and end-users are allowed to access such valuable contents in function of individual access rights defined by a user license. The invention also relates to a conditional access component for use in a conditional access network wherein a provider distributes valuable contents over the network and end-users are allowed to access such valuable contents in function of individual access rights defined by a user license.

BACKGROUND OF THE INVENTION

In a conventional network for the distribution of valuable contents such as Digital Video Broadcast "DVB", the end-user is provided with a conditional access unit that is either embedded in a Set-Top-Box or constitutes a pluggable module for insertion into a Common Interface ("CI") slot of a Set-Top-Box. In either case, the conditional access unit includes a SmartCard reader for accommodation of a subscriber card, i.e. a SmartCard (a Chip card) that contains required functionality and data to control secured access to the valuable contents in conjunction with the conditional access unit.

Due to general aspects of security, such as the level of protection against intrusion, and to technical requirements such as data formats, video resolution etc., content providers use different conditional access systems, and each conditional access system requires a specific conditional access component which the end-user must acquire to gain access to contents distributed with that particular conditional access system. A conditional access component includes both hardware and software, the software including a content provider's application. At the time of manufacture, the application is loaded into the non-volatile memory of the component, and a license fee is usually paid by the manufacturer to the content provider. The purchase price for a particular conditional access component thus includes a license fee.

SUMMARY OF THE INVENTION

The present invention provides a new way to allow an end-user to gain access to valuable contents distributed in any of a plurality of conditional access systems with just one conditional access component that has a basic functionality common to all of the plurality of conditional access systems, and that can be selectively enabled for any of the plurality of conditional access systems subject to the successful acquisition of a license. Thus, the invention allows an end-user to be authorized in consuming services from several different CA systems with the same device (contrary to the current state of the art where the device is linked to the CA). This device is then able to host one or more CA applications and one or more related authorizations, at the same time.

According to the invention, a method of operating a conditional access network is provided. Providers distribute valuable contents over the network and end-users are allowed to access such valuable contents in function of individual access rights. The valuable contents are made available to the end-users by way of a plurality of different conditional access systems. End-users are provided with a generic conditional access component having a basic functionality common to all conditional access systems. Particular conditional access systems are loaded on the conditional access components. The particular conditional access systems thus loaded on the component are initially disabled. A license is acquired for a particular conditional access system and the conditional access system is enabled subject to a successful verification of the license.

The invention also provides a conditional access component for use with the method. Specifically, the invention provides a conditional access component for use in a conditional access network wherein providers distribute valuable contents over the network and end-users are allowed to access such valuable contents in function of individual access rights. The component has a basic functionality common to a plurality of different conditional access systems used in the network. For each particular conditional access system to be used in the component, specific application software is loaded into a non-volatile memory of the component. A new application thus loaded is initially disabled. The component includes a license verifier. When a valid license for a particular conditional access system is found, the corresponding application is enabled.

BRIEF DESCRIPTION OF THE DRAWINGS

Further features and advantages of the invention will become apparent from the following description with reference to the drawings. In the drawings.

DESCRIPTION OF THE PREFERRED EMBODIMENTS

Figure 1:
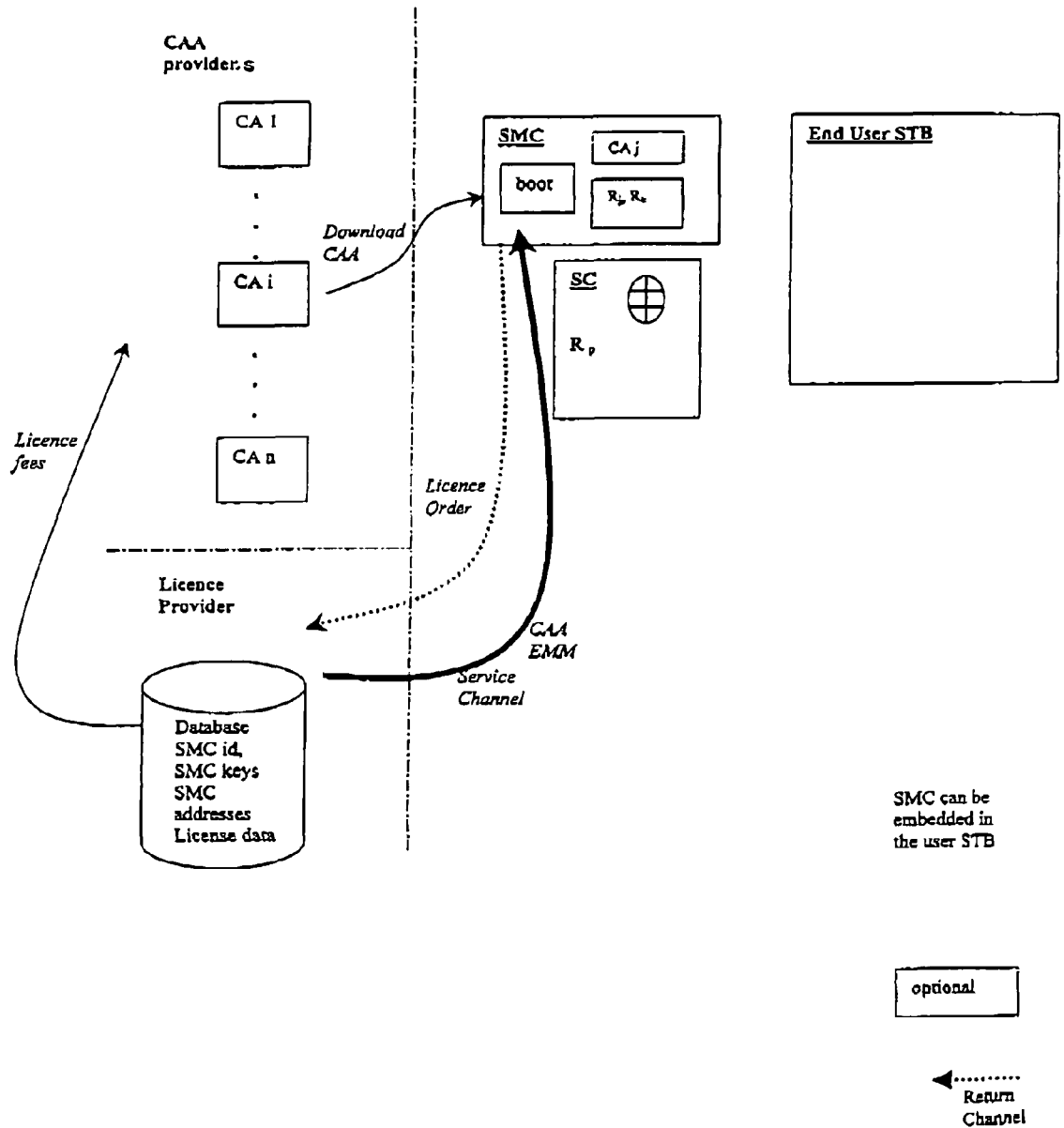
FIG. 1 is an overall view illustrating the relationship between an end-user side equipment, a number of conditional access application providers and a license provider.
Figure 2:
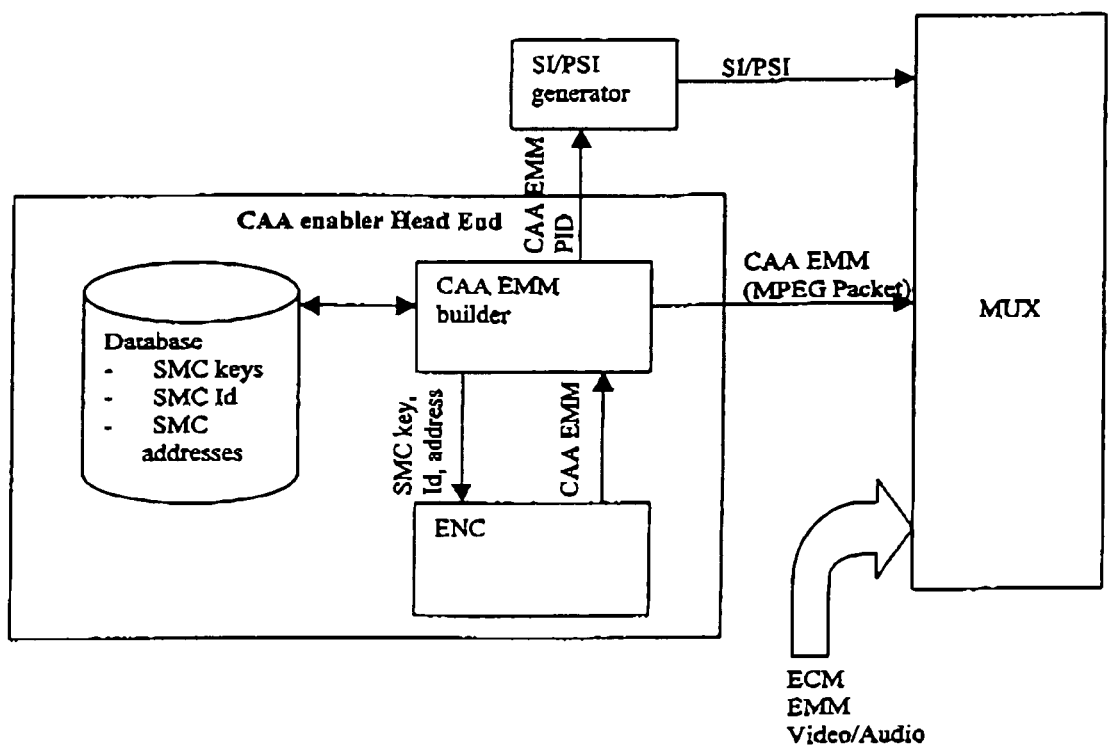
FIG. 2 is a block diagram illustrating a head-end conditional access application enabler framework.
Figure 3:
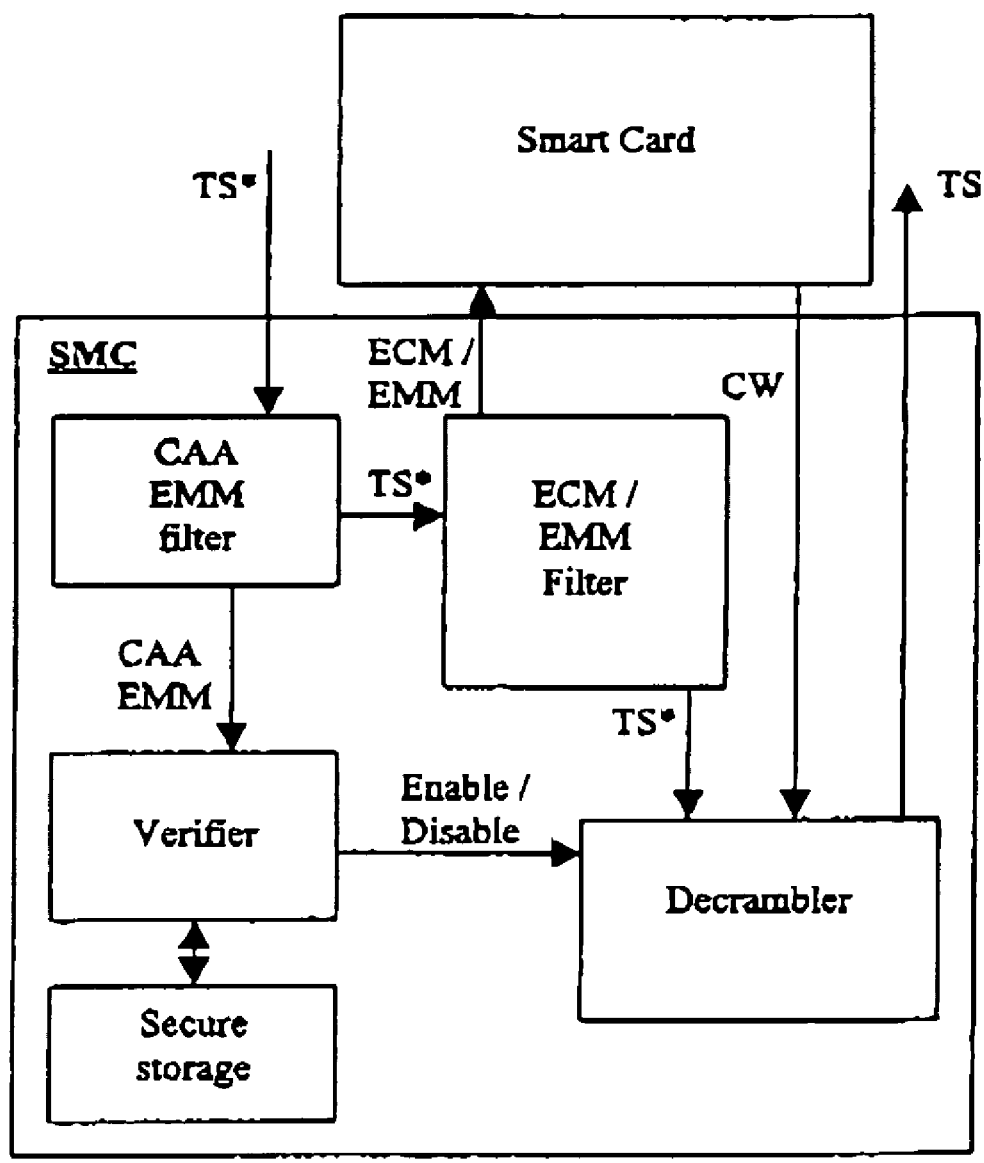
FIG. 3 is a block diagram of a conditional access component.
Figure 4:
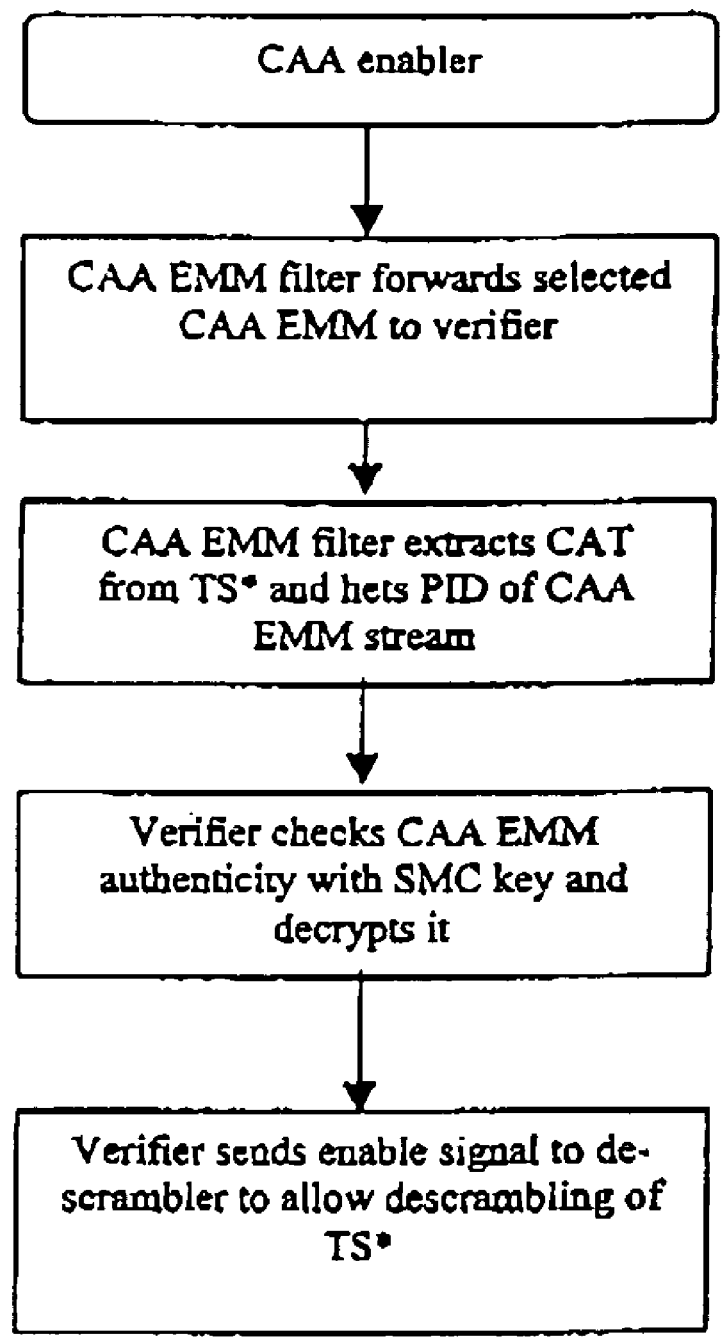
FIG. 4 is a flowchart illustrating essential steps of a procedure enabling the conditional access component to access contents received in a transport stream under a particular conditional access system.

Glossary, definition of entities and data:

AACC Authorized Automatic CA Configuration

ATR Answer To Reset: data sent by a smart card when it is plugged in

CAAP (CA application Provider) the entity that permits the secure download of CAA to the SMC.

CAA (CA application: the code that runs within the SMC, giving access to the related CAS services.

CA_ID Unique identifier of the CAS.

CAS (CA system) a system that enables an end-user to access to payTV programs

CAT CA Table, that contains the CAS descriptors (parameters, data, scripts . . . ).

End-user The people that want to watch the tv and pay for that.

Firmware all kind of binary code stored in the SMC (e.g. boot, OS, applications, drivers, . . . )

Licence This element allows the SMC to run legally the related CAA.

LO (Licence Order) this procedure permits to an end-user to acquire from the LP the right to run a CAA, having then access to its payTV programs.

LP (Licence Provider) this entity

LT Licence Table, that contains the CA Licence descriptors (parameters, data, scripts, . . . ).

MMI Man Machine Interface: a resource provided by the STB to the SMC to allow it to display data.

Subscription
payTV programs Programs scrambled under control of a specific CAS.
SC (Service Channel) a channel that carries parameters (configuration file, data, scripts) related to each CAS
Script a sequence of commands that are executed by the SMC
SerNo Serial Number, unique value that identifies an entity (SmCa, SMC, . . . )
SMC Secure MultiCAS Component: It is made of one or more devices; is a secure one, able to store, run and/or handle applications & data in a secure way: it means that any element within is protected against modification and illegal access.
SmCa Smart Card
SMC keys secret and/or public data used for security-orineted services (e.g. integrity, authentication, confidentiality)
TS Transport Stream
TiSe (Timing Service) a service that provides right date and time, available either outside or inside the SMC (e.g. a clock).
Sequence of Operations:
1 the end-user buys the component (SMC)
2, in parallel:
2 he retrieves the CA Application that will run on the device
2' he acquires the authorization to use such application
3 he consumes the CA services
The steps 2 and 2' could be made in any order.
Description of the Different Actions to be Considered:
1. SMC Purchasing
   The end-user buys a SMC.
   This device does contain at least boot firmware, able to manage security, handle smart cards, perform secure download, process licences. The SMC could also embed some other applications such as CAA (one or more). In term of data, it could embed one or more licences for one or many CAS.
2. CAA Acquisition
   In this part, we develop the process used for acquiring the CA Application and the parameters needed to configure the CAS and the SMC.
   Conditional Access Application means the firmware needed to process the encrypted A/V data using the different keys and licence in order to deliver a clear content to the end-user according to its rights.
   Three steps must be passed to get a CAA "pending" ready to be activated inside the SMC: CAA identification, CAA configuration and CAA acquisition.
CAS Identification
   1. The SMC retrieves CASs descriptors by listening the CAT on the SC (which is always available to the SMC).
   2. identification is triggered by an event:
   it could be a manual event (through MMI): The user can access a menu proposing CASs available for the end-user.
   it could be one of the following four events:
      SmCa insertion: If the user inserts a SmCa into the SMC, then a process of automatic CAS identification is launched.
      Module insertion or Module menu: the Module firmware can propose a set of CAAs that are identified as present and in the Service Channel, through the CAT.
      Content triggering, downstream event: If the channel selected by the user is protected by a CAS requiring a specific CAA not present as valid in the SMC, and if the considered CAA is conform to the AACC, then a new CAS is automatically identified.
      License presence (means step 2' has been already performed): If the license corresponding to a CAA is present and valid in the SMC, then the corresponding CAA is identified as required by the CAS to go on configuration phase.
   At this step, the CAS has been chosen.
   3. The SMC checks the presence of the corresponding CAA inside it.
   4. If the considered CAA is present and conform to the latest version (using information coming from the CAT), then the CAA acquisition is considered as achieved.
   5. If the considered CAA is not present or in an older version, then the CAS identification is complete.
   At the end of the CAS identification, the SMC knows CA_D and may have CAA.
CAA Configuration
   Once identified, the CAA needs a lot of dynamic parameters to be set. The fact that different CASs can be loaded inside the SMC, added to a need of adaptation skill to prevent obsolescence of the architecture implies that the CAA could come with its parameters through a dedicated specific Service Channel.
   The Service Channel can be a database carried by the downstream, and containing the following parameters that will allow
   the CAS to be configured and downloaded using for example a script.
   and the SMC itself to be configured to integrate the new CAA.
   Some of the parameters can be used by both the CA and the SMC, and can be:
      the ATR of the SmCa in order to identify it
      The SerNo corresponding to the Smart Card or to the CA to be downloaded (including e.g. mask features for zoning)
      The script describing the method to be used to download the CAA firmware (location of data, files locations and their signature . . .
      A reference to the license needed to unlock the CA.
   At the end of the CAA configuration, the SMC knows CA_ID and how and where it can get the latest version of the CAA.
CAA Acquisition
   Once identified and configured, the CAA must be acquired by the SMC (e.g. by a download). At the end of this process, the CAA will be fully available to the system, but will remain locked until all the rights (especially the license) have been checked successfully.
   The CAA acquisition can be proceeded as following:
   1. The CAA can be already present in the SMC, whether because the system was sold with this CAA inside, or because this CAA was already acquired (pre-stored) in the system in a previous session. Then, its integrity and validity must be checked, and the acquisition is considered as ended.
   2. The script contained in the Service channel can be ran in order to download the CAA over the air, setting the tuner on the appropriate transponder and channel, and filtering the downstream in order to collect the correct files.
   At the end of the CAA acquisition, the SMC has the latest version of the CAA relative to the CA_ID. The CAA is in a locked state until the license and required rights have been checked as valid and up-to-date.

2'. Licence Acquisition
2'0. Description of the Licensing System
The CAA enabler Head End (owned by the LP) is:
a CAA EMM builder,
an encryption unit (ENC) and
a database to store information like SMC identifier (SMC id), SMC addresses and SMC keys in a secure manner.
This Head End component will generate CAA EMMs (used for Licence transport) in MPEG packet format and sends these to the connected multiplex (MUX) that receives also Video/Audio data, standard EMM and ECM, Service Information (SI) and Program Service Information PSI). In addition it transmits the CAA EMM Packet Identifier (PID) and the CA_SYS_ID to the SI/PSI generator.
The task of the SI/PSI generator is to modify the Conditional Access Table (CAT), i.e. to add a ca_descriptor( ) containing the CAA EMM PID and the CA_SYS_ID. The purpose is to signal the CAS where it will find the CAA EMM stream. The mechanism is identical to the one used for the EMM play out.
On the receiver side, in the SMC, the CAA enabler consists of three components:
the CAA EMM filter,
the verifier (a part of the firmware that is able to check EMM validity) and
a secure storage to store SMC SerNo, SMC addresses, SMC keys and control data. This storage area is protected against unauthorized access and modification.
The CAA EMM filter extracts the CAT from the encrypted transport stream TS* and analyses it to get the PID where the CAA EMM stream is played out. The next task is to interpret the CAT to find the CAA EMM which is addressed to the specific module. If one is found the filter unit sends the CAA EMM to the verifier.
The verifier uses a SMC key to proof the authenticity of the EMM (e.g. by using digital signature feature) and in the case of a successful verification, it decrypts the CAA EMM. The next step is to process the instructions of the CAA EMM payload. In the case of an activation the SMC enables e.g. the de-scrambler to produce the clear stream TS.

2'.1 Licence Identification:
The end-user selects manually or automatically, thru the SMC, the CAS he wants to acquire. It leads for the SMC to the knowledge of the CA_ID.
It could be done in different manners:
2'.1.a insertion of the SMC, or service selection: it then triggers a select feature, thru an MMI, (e.g. using a menu and the remote control).
2'.1.b insertion of the CA smart card: it then identifies the CA_ID, as it is embedded in the smart card. This value is sent to the SMC.
2'.1.c content triggering: by choosing himself a channel or a service, the end-user selects and identifies the CAS.
At the end of this point, the SMC knows the CA_ID 2'.2 Licence Configuration
The SMC retrieves all parameters (e.g. fees, phone number, SerNo, licence options) associated to the CA_ID, required for Licence access, in order to perform the retrieval of the CA-licence. This information can be taken in the Service Channel (from the LT) or in a fixed database stored in the SMC.
At the end of this point, the SMC knows where and how access to the CA licence(s).

2'.3 Licence Acquisition:
If a return channel exists,
the end-user processes a request to the LP for the CA-licence, to do that, the end-user, using config parameters, requests for a licence from the LP (e.g. financial transaction), bringing in the sent data everything requested by the LP (e.g. SMC SerNo, identity, . . . ).
the LP sends the specific licence, after complete payment, the LP processes data specific to the end user SMC and the chosen CAA, and sends them to the SMC (e.g. EMM).
If no return channel exists
the end user buys a prepaid card, embedding a CA-licence
the licence is downloaded in the SMC, made specific (i.e. the licence is linked to the SMC SerNo).
Later, when rights are used, the credits in the card are burned.
At the end of this point, the SMC has a licence of use for a specific CAS.

3. Consumption of PayTV Programs
The end-user wants to consume programs or services. The CAA enabler feature requires some additional hardware resources on the head end component and on the SMC component. This is described in 2'0. Here is the sequence:
3.1 the end user selects a channel or a service he wants to consume
3.2 the SMC checks the corresponding CAA (i.e. CAA (CA_ID(channel)): (optional) checks presence of the smart card related to the CA
checks that the CAA is not corrupted and locked
3.3 the SMC checks the CA licence:
checks the licence presence
checks the licence parameters are OK (date-by using the TiSe-, identity, SerNo, . . . ).
3.4 the SMC runs the CAA.

The invention claimed is:
1. A method of operating a conditional access network wherein providers distribute valuable contents over the network and end-users are allowed to access such valuable contents in function of individual access rights, wherein the valuable contents are made available to the end-users by way of a plurality of different conditional access systems, the method comprising the steps of:
configuring a generic conditional access component having a basic functionality common to all conditional access systems and a plurality of particular conditional access systems, said plurality of particular conditional access systems being preloaded into a non-volatile memory of the component, but initially disabled;
providing the generic conditional access component with the preloaded plurality of initially disabled particular conditional access systems to an end-user;
inserting a smart card comprising a conditional access identification;
identifying a particular preloaded conditional access system to be used by the conditional access component based on the conditional access identification;
receiving by the conditional access component, by reception of an EMM, a license related to the identified particular preloaded conditional access system; and
enabling the particular preloaded conditional access system by the conditional access component aiter successful verification of the license by the conditional access component.

2. The method of claim 1, wherein the valuable contents are distributed in a digital transport stream that contains Entitlement Management Messages "EMMs" specific to each conditional access system.

3. The method of claim 2, wherein each conditional access component includes a filter unit for filtering out the specific EMMs of conditional access systems.

4. The method of claim 3, wherein the valuable contents in the transport stream are scrambled, each conditional access component has a descrambler adapted to process a scrambled transport stream into a clear transport stream, and the descrambler is enabled or disabled in function of a successful or unsuccessful verification, respectively, of the access rights.

5. The method of any of claims 1 to 4, wherein each conditional access system has an associated application for execution by the conditional access component.

6. A conditional access component which is useful in a conditional access network wherein a provider distributes valuable contents over the network and end-users are allowed to access such valuable contents in function of individual access rights defined by a user license, wherein said component comprises a first software module embedding a basic functionality common to a plurality of different conditional access systems used in the network, said module allowing a particular identified conditional access system to be enabled subject to successful verification of a license therefore, a plurality of preloaded specific application software, each constituting a particular conditional access system in conjunction with the basic functionality, a non-volatile memory for storing said plurality of specific application software, said particular preloaded conditional access systems being initially disabled in the non-volatile memory, a smart card inserted into said component, said smart card identifying a particular conditional access system, said conditional access component receiving an EMM containing a license for the particular identified preloaded conditional access system, and said conditional access component selectively enabling the particular identified preloaded conditional access system subject to a successful verification of the corresponding license by the conditional access component.

7. The conditional access component of claim 6, wherein the valuable contents are distributed in a digital transport stream that contains Entitlement Management Messages "EMMs" specific to each conditional access system, and comprising a filter unit for filtering out specific EMMs of conditional access systems enabled on the component and a verifier unit for the verification of access rights defined by the filtered specific EMMs.

* * * * *